(12) United States Patent
Marroncelli

(10) Patent No.: US 6,497,539 B2
(45) Date of Patent: Dec. 24, 2002

(54) CLAMPING DEVICE FOR A MACHINE TOOL

(76) Inventor: Vincent P. Marroncelli, 52 Country Club Blvd., Apt. 605, Worcester, MA (US) 01605

(*) Notice: Subject to any disclaimer, the term of this patent is extended or adjusted under 35 U.S.C. 154(b) by 0 days.

(21) Appl. No.: 10/039,281

(22) Filed: Jan. 2, 2002

(65) Prior Publication Data

US 2002/0110433 A1 Aug. 15, 2002

Related U.S. Application Data

(63) Continuation-in-part of application No. 09/759,955, filed on Jan. 12, 2001, now abandoned.

(51) Int. Cl.[7] ............ B23C 9/00; B23B 21/00; F16H 25/00
(52) U.S. Cl. ............ 409/146; 74/89.39; 82/141
(58) Field of Search .......................... 409/162, 163, 409/167, 153, 146, 190, 219, 226, 241; 74/89.39, 409, 441, 89.32; 82/141

(56) References Cited

U.S. PATENT DOCUMENTS

| | | | |
|---|---|---|---|
| 1,930,567 A | 10/1933 | Shaw et al. | 90/58 |
| 2,162,611 A | 6/1939 | Dreher | 144/290 |
| 3,064,489 A | 11/1962 | Deprez et al. | 409/146 |
| 3,427,696 A | 2/1969 | Shallenberg | 29/1 |
| 3,540,552 A | 11/1970 | Eich | 188/77 |
| 3,640,138 A | 2/1972 | Hahn et al. | 74/89.15 |
| 3,663,027 A | 5/1972 | Klipping | 279/4 |
| 3,665,805 A | 5/1972 | Wolf | 90/14 |
| 3,733,961 A | 5/1973 | Reynolds | 90/21 R |
| 3,837,261 A | 9/1974 | Hoddinott | 90/58 A |
| 3,945,749 A | 3/1976 | McIlrath | 408/95 |
| 5,025,914 A | 6/1991 | Narushima | 198/660 |
| 5,429,461 A | 7/1995 | Mukherjee et al. | 409/163 |
| 6,267,021 B1 * | 7/2001 | Mauro | 359/391 |

FOREIGN PATENT DOCUMENTS

| | | | | |
|---|---|---|---|---|
| JP | 62-24942 | | 2/1987 | |
| JP | 362173138a | * | 7/1987 | 409/146 |
| JP | 4-201152 | | 7/1992 | |

* cited by examiner

Primary Examiner—William Briggs
(74) Attorney, Agent, or Firm—Bowditch & Dewey, LLP

(57) ABSTRACT

A clamping device for a machine tool that is securable to a work table of the machine tool. The machine tool typically has a work table and a saddle. The worktable is slidably mounted to the saddle. An elongated table screw is carried by the work table and extends through threaded block carried by the other saddle. A pair of jaws of the clamping device each have an acurate surface for engaging the elongated table screw. A mechanism moves the jaws relative to each other and into a closed position engaging and retaining the elongated table screw.

31 Claims, 18 Drawing Sheets

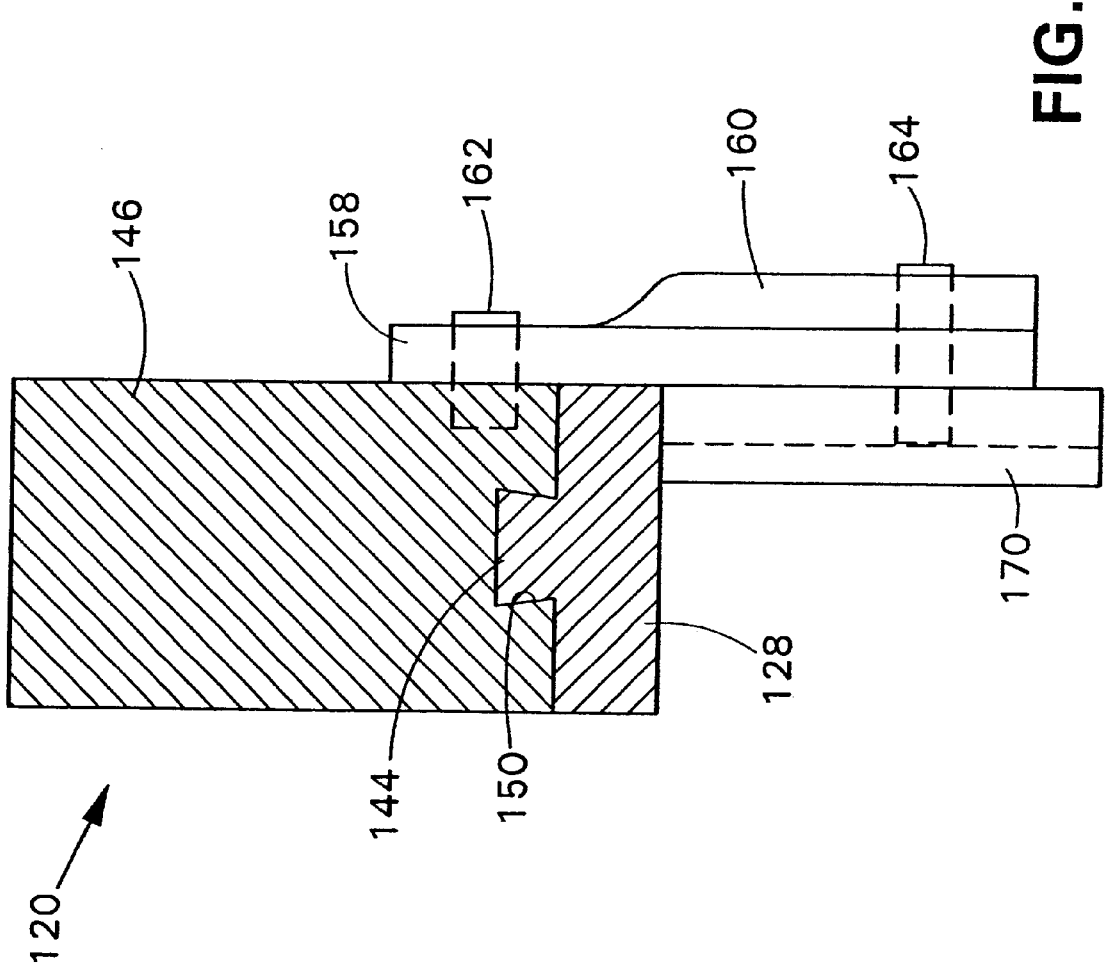

US 6,497,539 B2

1

CLAMPING DEVICE FOR A MACHINE TOOL

CROSS REFERENCES TO RELATED APPLICATIONS

The present application is a continuation-in-part of U.S. patent application Ser. No. 09/759,955, filed Jan. 12, 2001 now abandoned.

The entire contents of the above application are incorporated herein by reference in entirety.

BACKGROUND OF THE INVENTION

In a machine tool such as a milling machine, the work to be machined is mounted to a table. The table is movable relative to a machining head having the tool, such as a cutter, to position the piece to be machined, the work piece, relative to the machining tool. In order to position the work relative to the machining head, the table is movable by the table being slidably mounted to a second movable unit, commonly referred to as a saddle which in turn is movable relative to a third movable unit, commonly referred to as a knee. This last movable unit, the knee, is movable relative to the base of the machine tool. By adjusting the position of each of the movable units, the table with the workpiece can be positioned vertically, transversely, and longitudinally relative to the base and the machine head of the machine tool. Once the table has been adjusted relative to the base and the machine head, it is critical that the table be maintained in a fixed position relative to the base while the work piece is being machined on the table.

SUMMARY OF THE INVENTION

This invention relates to a clamping device for a machine tool. The machine tool typically has a work table and a saddle. The worktable is slidably mounted to the saddle. An elongated table screw is carried by the work table in a preferred embodiment. A threaded block is carried by the other unit, the saddle, and threadably receives the elongated screw.

The clamping device has a frame that is securable to the worktable. A pair of jaws each have an acurate surface for engaging the elongated screw. A mechanism moves the jaws relative to each other and into a closed position engaging and retaining the elongated screw.

In one embodiment, one of the jaws is fixed to the frame and the other jaw, a movable jaw, is movable relative to the fixed jaw and the frame. The movable jaw is movable by rotation of a threaded screw carried by the frame and having an end engaging the movable block.

In one embodiment, the clamping device has a base attachable in a fixed position relative to the work table and a pair of clamping jaws slidably mounted on the base for movement toward and away from each other. The jaws are linked to the base and to each other so that movement of a first one of the jaws toward a second one of the jaws causes the second jaw to move toward the first jaw. An actuator is connected to one of the jaws for moving the jaws toward one another for clamping the longitudinal screw to prevent the screw from rotating.

In one embodiment, one of the jaws or blocks has a projecting tooth receivable in the groove between a pair of threads in the elongated table screw. The projecting tooth is moveable in one direction, such as vertically, relative to the jaw.

In one embodiment, an adjustment screw is carried by the clamp frame to space the clamp frame from the work table.

2

A spacer is interposed between the adjustment screw and the work table. A T-bolt is carried by the clamp frame and receivable in a slot in the work table to secure the clamping device to the work table.

In one embodiment, one of the jaws has a slot for receiving a guide pin of an actuator. The slot is at angle relative to the perpendicular direction to the motion of the jaw. An insert has a plurality of arcuate surfaces to receive the guide pin is receivable by the slot.

BRIEF DESCRIPTION OF THE DRAWINGS

The foregoing and other features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention

FIG. 10 is a cross-sectional view of the clamping device taken along line 10—10 of FIG. 9A;

DETAILED DESCRIPTION OF THE INVENTION

Figure 1:
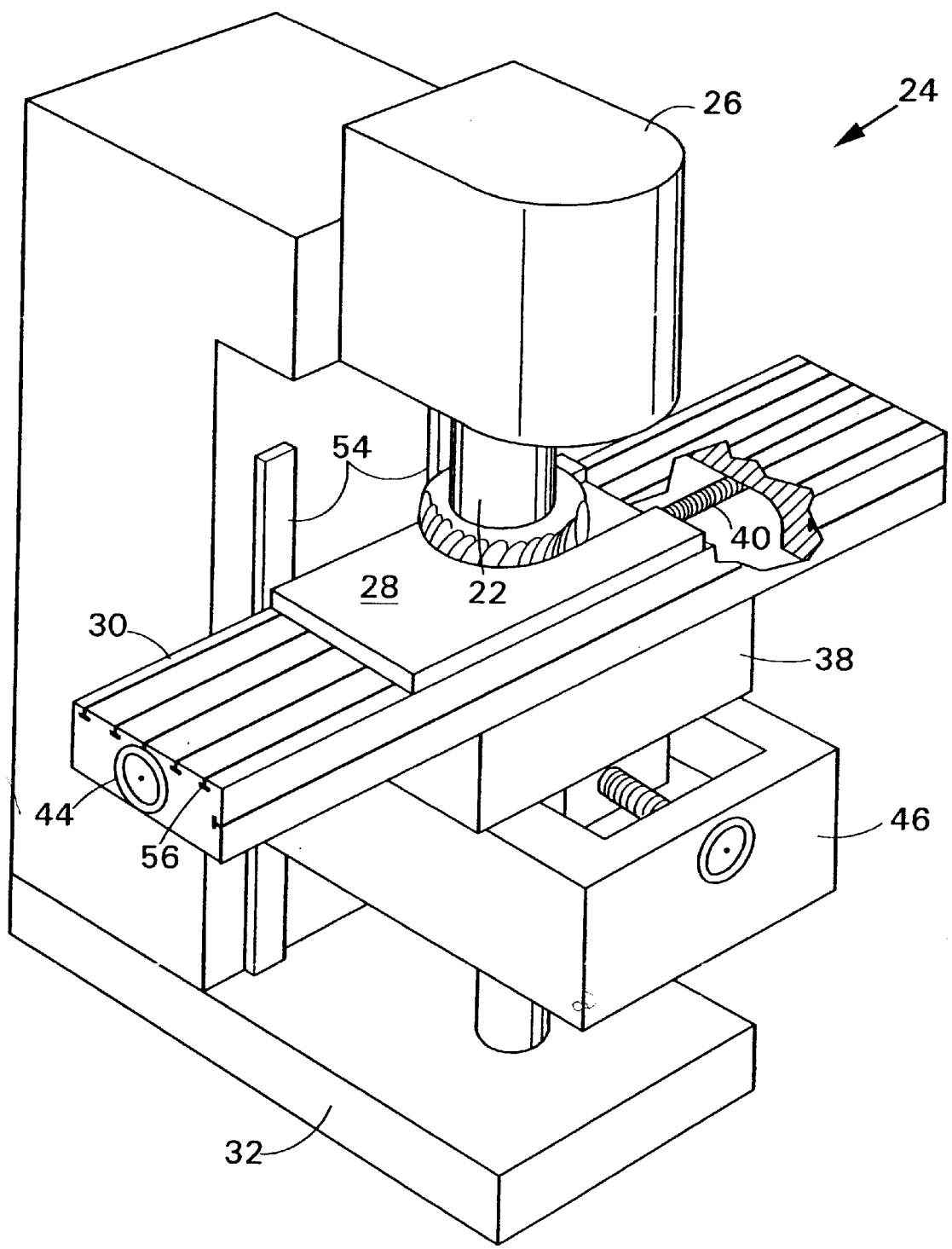
FIG. 1 is a perspective view of a milling machine with portions broken away.

Referring to the drawings in detail, where like numerals indicate like elements, there is illustrated a clamping device in accordance with the present invention designated generally as 20.

Referring to FIG. 1, a machine tool such as a milling machine 24 has a tool 22, held by a machine head 26, that operates on a work piece 28. The work piece 28 is held by clamps or other methods securely to a work table 30 of the milling machine 24. In order to position the work piece 28 relative to the machine head 26 of the milling machine 24 for proper operation, the work table 30 needs to be able to move in three directions relative to a base 32 of the milling machine 24. The machine head 26, which receives the cutter or other tool 22 is rigidly connected to the base 32. In order to allow the work table 30 to move relative to the base 32, a series of intermediate units are located between the work table 30 and the base 32, wherein each unit allows motion in one direction relative to its adjacent unit.

Figure 2:
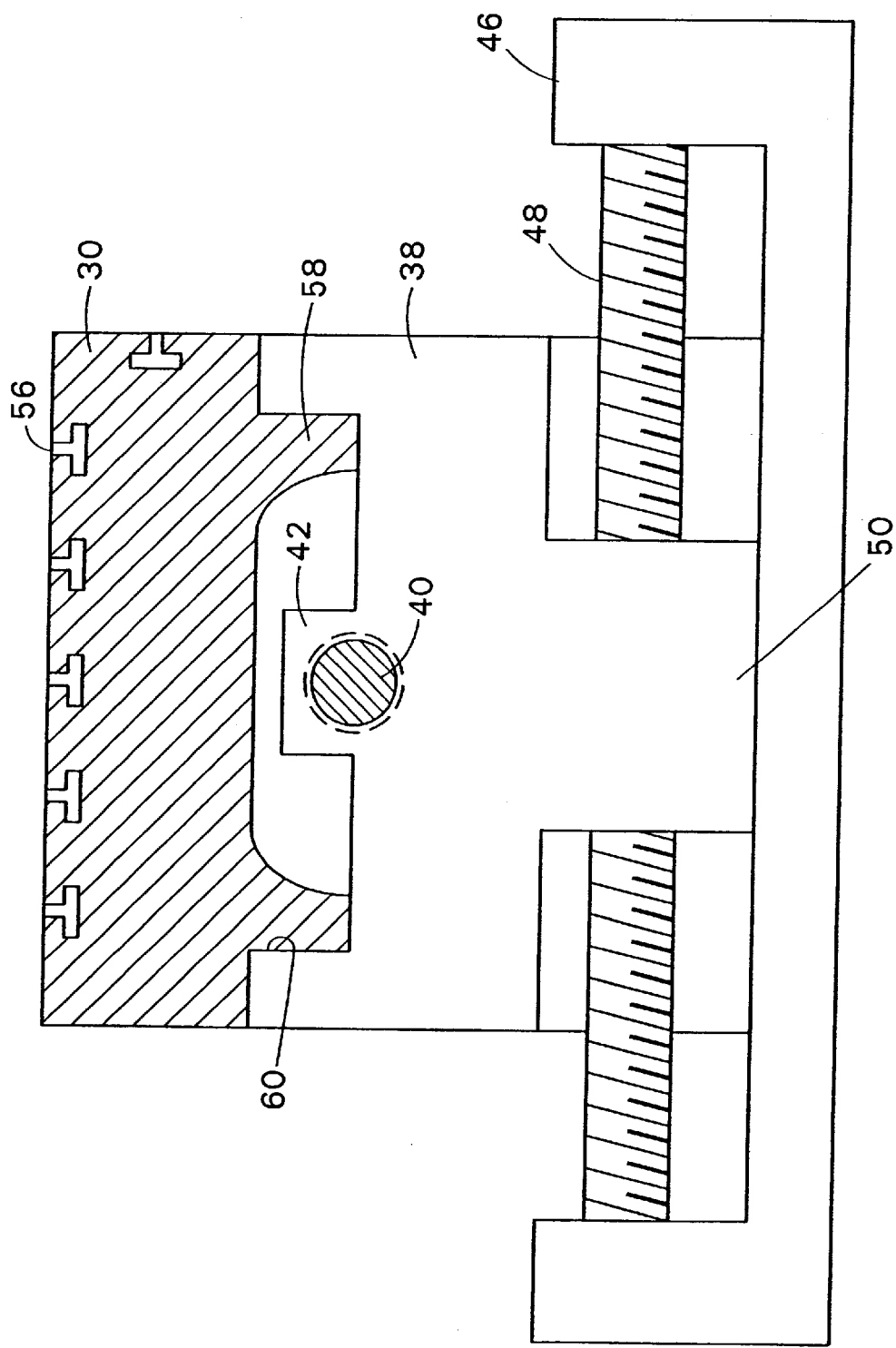
FIG. 2 is a sectional view of a portion of the milling machine of FIG. 1 taken along line 2—2.

The work table 30 is slidably received by one of the intermediate units which is commonly referred to as a saddle 38 or a secondary base. The work table 30 is capable of moving in a longitudinal direction relative to the saddle 38. The milling machine 24 has a threaded lead screw 40, also referred to as a table screw, that is carried by the work table 30 and received by a threaded block 42 of the saddle 38 as seen in FIG. 2. The threaded block 42 is also referred to as a worm. The rotation of the threaded screw 40 using a handle wheel 44 carried by the work table 30 moves the threaded screw 40 through the threaded block 42 therein moving the work table 30 longitudinally relative to the saddle 38.

The work table 30 in the prior art was held in position relative to the saddle 38 by a locking screw that prevents rotation of the wheel handle 44 relative to the work table 30, and therefore the rotation of the lead screw 40 relative to the threaded block 42. In that the lead screw 40 cannot rotate relative to the threaded block 48, the work table 30 is held in position relative to the saddle 38. However, the locking screw does not sufficiently limit rotation of the handle 44 and the lead screw 40 and therefore does not sufficiently hold the work table 30 securely in place relative to the saddle 38. The invention as described below with respect to FIGS. 3–14 solves this problem.

Referring to FIGS. 1 and 2, the saddle 38 likewise is received and slidably mounted to a unit referred to as a knee 46. A threaded screw 48 of the milling machine 24, a saddle threaded screw 48, is received and rotateably mounted to the knee 46. A threaded block 50 is carried by the lower portion of the saddle 38 and by rotation of the saddle threaded screw 48, the saddle 38 is able to move transversely relative to the knee 46. This transverse motion moves the work table 30 relative to the base 32 of the milling machine 24, and more particularly the machine head 26 with the tool 22.

Still referring to FIGS. 1 and 2, the knee 46 is adjustable in the vertical direction relative to the base 32 and has a pair of slots received in a pair of rails 54 on the base 32 of the milling machine 24. The knee, one of the intermediate units, is movable in the vertical direction relative to the base 32 of the milling machine 24 by a thread screw adjusted by a handle.

With respect to both the movement between the knee 46 and the base 32, and the saddle 38 relative to the knee 46, the milling machine 24 has other mechanisms to secure the units to prevent relative movement. In addition, in that relative motion between these compounds are further away from the interaction between the tool 22 and the work piece 28, the need for a tighter control over the moving mechanism is not as necessary as between the work table 30 and the saddle 38.

In order to machine or drill a work piece, the user of the milling machine 24 clamps the work piece 28 to the work table 30 and positions the work table 30 relative to the cutter 26. The work table 30 has a plurality of "T" slots 56 that are used in conjunction with clamps to secure the workpiece 28. The positioning of the work table 30 is such that the tool, such as a cutter 22 is positioned to perform the required operation on the work piece 28. The work table 30 is positioned relative to the tool 22 by movement, i.e., rotation, of the threaded screws 40 and 48 relative to their respective threaded blocks 42 and 50 and by rotating the handle, a crank handle, for moving the knee relative to the base so that the work table 30 is in the proper position. Once the work table 30 is in the proper position it is imperative that the work table 30 not move relative to the base 32 and the tool 22.

Referring to FIG. 2, a sectional view of a portion of the milling machine 24 is shown including a section through the work table 30 and the saddle 38. The work table 30 has a pair of rails 58 that are received within a slot 60 of the saddle 38. The rail 58/slot 60 interface allows the work table to move laterally, in and out of the page as seen in the Figure, relative to the saddle 38. The threaded screw 40 which is shown here extending through the threaded block 42 is rotated to move the work table 30 relative to the saddle 38. Likewise, the saddle 38 moves in the transverse direction, left and right on the page relative to the knee 46 using the saddle threaded screw 48 that passes through the threaded block 50 of the saddle 38.

The above is a description of a typical milling machine; it is recognized that other machine tools may have other mechanisms for placing the work table 30 relative to the tool 22 carried by the machine head 26. The invention as described below relates to the securing of the work table 30 or other units that are positioned by movement of the threaded lead screw 40.

Figure 3:
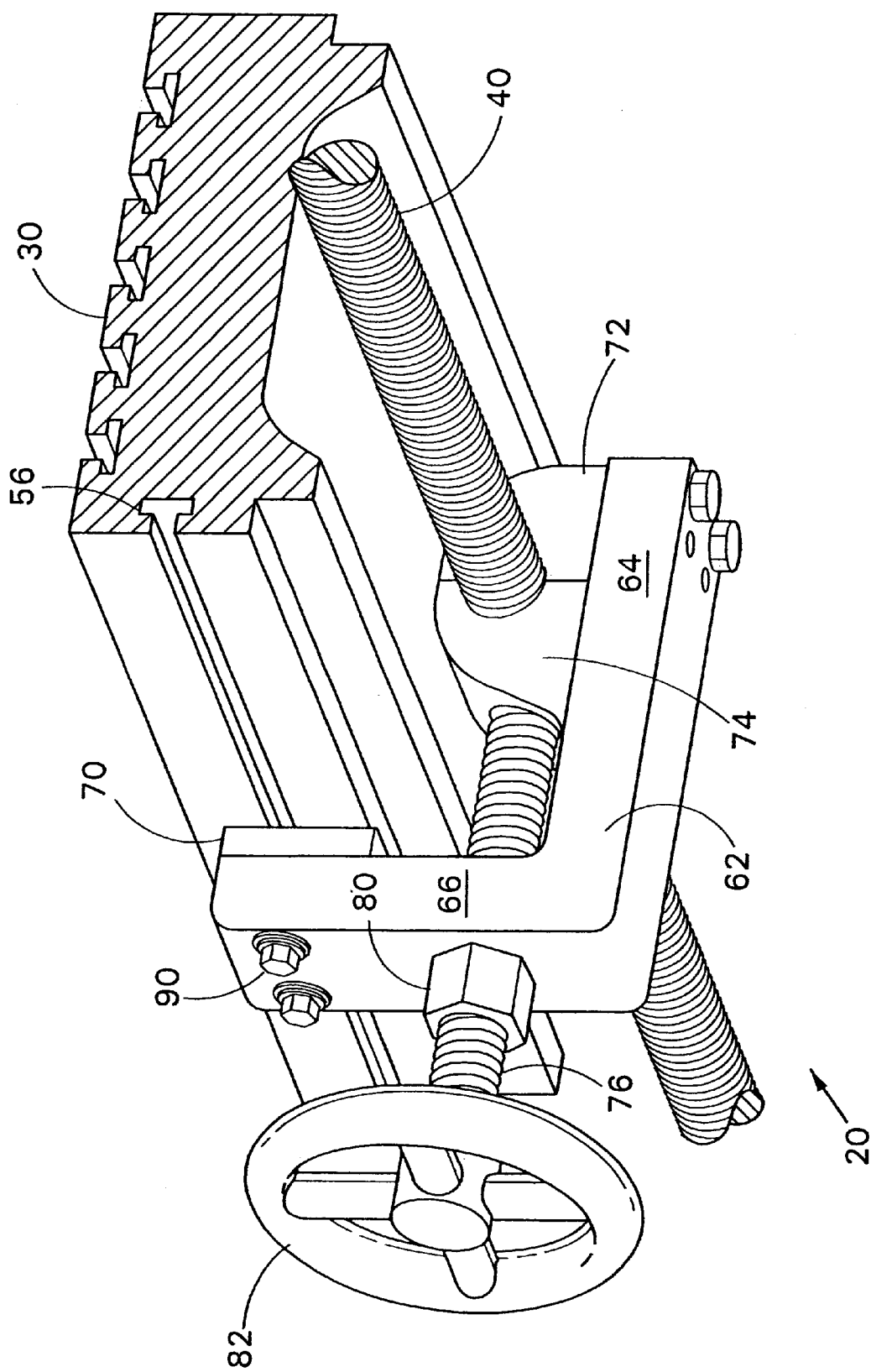
FIG. 3 is a perspective view of a clamping device according to the invention carried by the work table of the milling machine and clamping tool.

As indicated above, the work table 30 is moved relative to the saddle 38, by rotation of the threaded lead screw or table screw 40 therein moving the threaded lead screw 40 laterally relative to the threaded block 42. Referring to FIG. 3, the clamping device 20 according to the invention is secured to the work table 30 and grasps or clamps the threaded screw 40 to prevent rotation.

Figure 5:
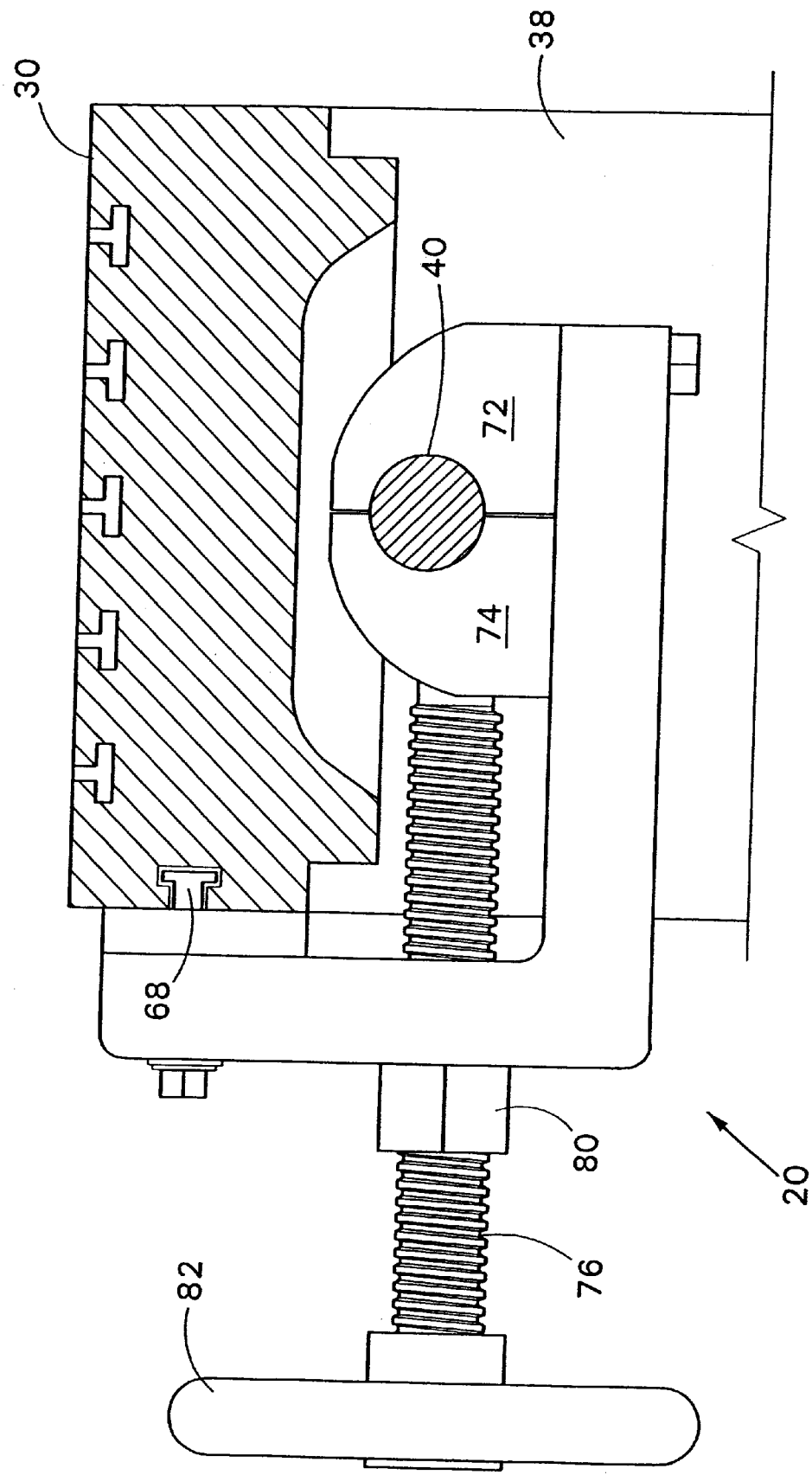
FIG. 5 is a sectional view of a portion of the milling machine with a clamping device according to the invention.

Referring to FIG. 3, the clamping device 20 has a clamping frame 62 which is carried by the work table 30. The clamping frame 62 has a "L" shape with a long base 64 and a projecting upright 66. A "T" bolt is carried by the upright 66 of the clamp frame 62 and is received by a "T" slot 56 on the front surface of the work table 30 as seen in FIG. 5. The clamping device 20 in one embodiment includes a spacer or shim 70 to properly position the clamp frame 62 relative to the threaded lead screw 40, also referred to as the table screw. The shim 70 is retained by a pair of fasteners 90.

In addition, the clamping device 20 has a pair of blocks 72 and 74, also referred to as worm jaws, that encircle the threaded screw 40. The blocks 72 and 74 when in the clamped position engage the threaded lead screw 40 and prevent rotation. In the embodiment shown, one of the blocks is a fixed block or worm jaw 72 which is secured to the clamping frame 62; the other block, a movable block or worm jaw 74, is moved into engagement with the fixed block 72 and around the threaded screw 40 by use of a threaded acme rod 76. Each of the blocks or jaws 72 and 74 have an acurate surface that is complimentary to the shape of the outer diameter of the threaded screw 40.

Figure 4:
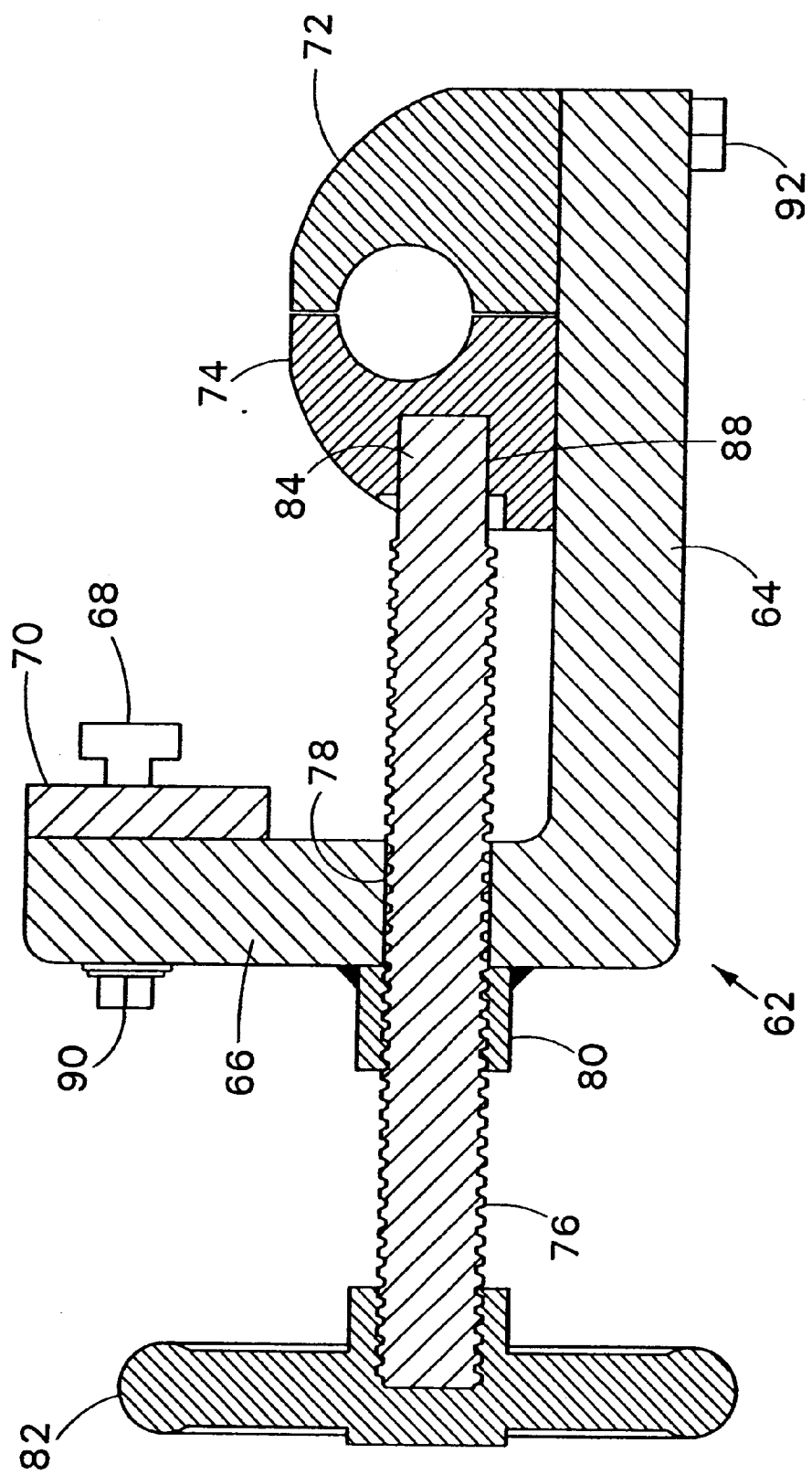
FIG. 4 is a sectional view of the clamping device.

Referring to FIG. 4, the threaded acme rod 76 extends through a hole 78 in the upright 66 of the clamping frame 62. In the embodiment shown, the hole 78 is not threaded and a threaded nut 80 is secured collinear to the hole 78 in the clamping frame 62. In the embodiment shown, the threaded nut 80 is welded to the outside surface of the projecting upright 66 of the clamp frame 62.

It is recognized that the rotation of the acme rod 76, such as by the handle 82, moves the rod 76 in and out relative to the clamping frame 62 (to the right or to the left in FIG. 4) therein moving an end 84 of the rod 76. The end 84 of the acme rod 76 is received in the bore 88 in the movable block 74 such that when the acme rod 76 is rotated in the proper direction moving the end 84 of the rod 76 toward the fixed block 72, the movable block 74 is forced in this direction. In the embodiment shown, while the end 84 of the acme rod 76 is received in the bore 88 of the movable block 74, the movable block 74 is not secured to the acme rod 76 and the acme rod 76 can be moved backwards without the movable block 74 moving. The release of the force on the movable block 74 by the acme rod 76 allows the movable block 74 to move away from the threaded lead screw 40 to allow the threaded lead screw 40 or table screw to rotate.

Figure 6:
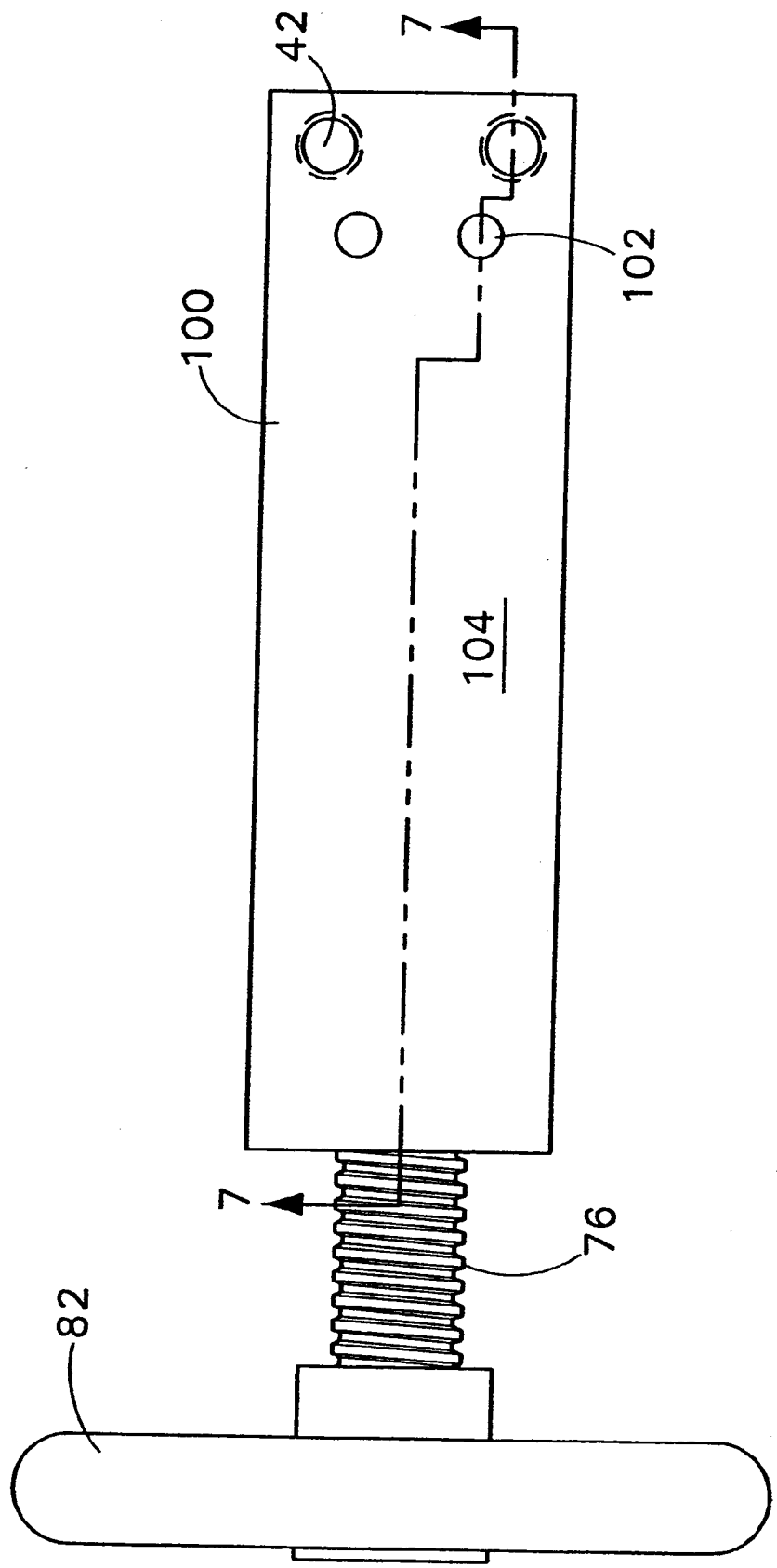
FIG. 6 is a bottom view of the clamping device.
Figure 7:
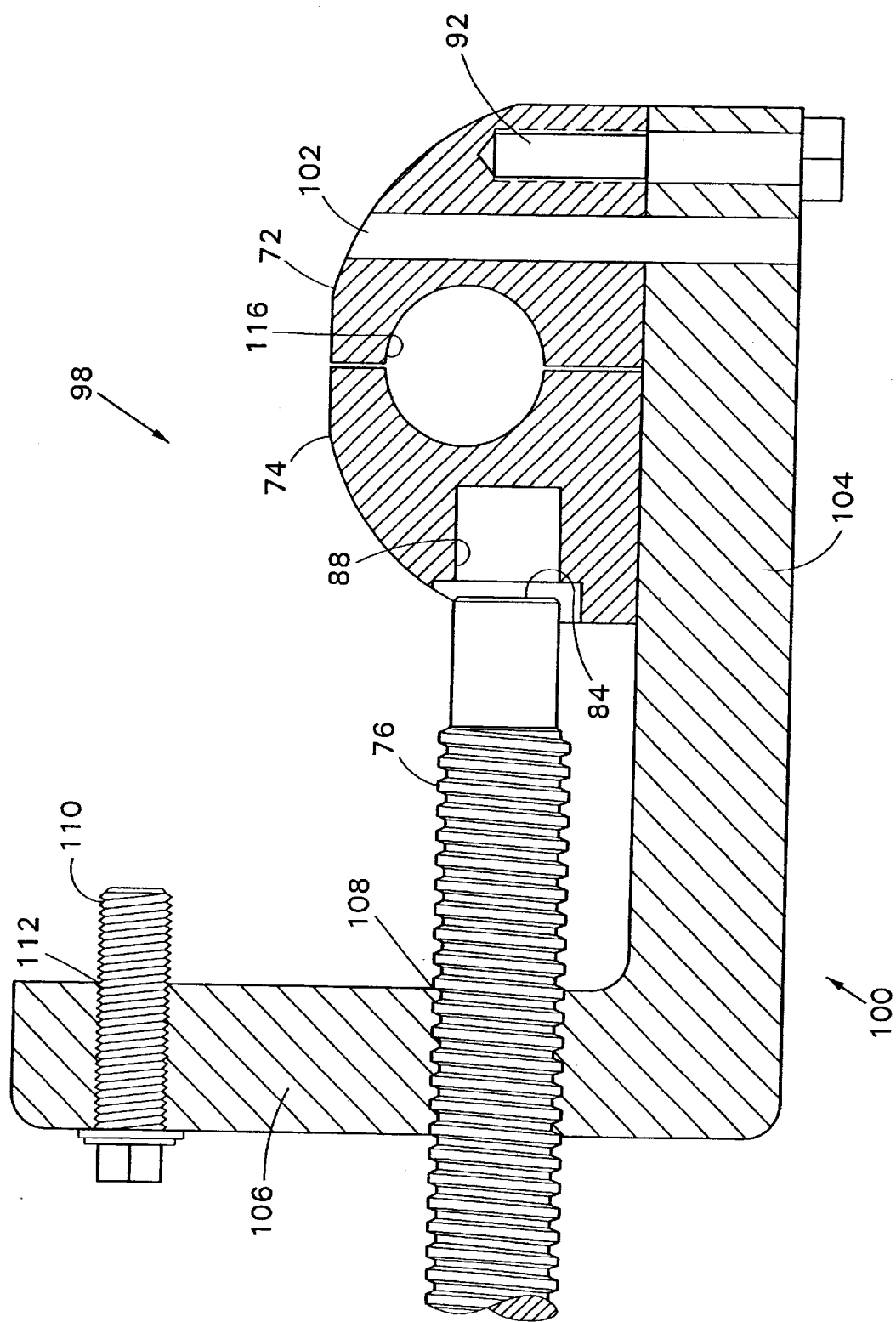
FIG. 7 is a sectional view taken along line 7—7 in FIG. 6.

Still referring to FIG. 4, the spacer 70 is secured to the projecting upright 66 by a pair of fasteners such as bolts 90. These bolts 90 are in addition to the T-bolt 68. In addition, a pair of fasteners 92 extend through the long base 64 of the clamp frame 62 to secure the fixed block 72, also referred to as a fixed worm jaw or end worm. A pair of dowels are also used to secure the fixed block 72; FIGS. 6 and 7 show a pair of dowels related to an alternative embodiment, but the configuration is similar in this embodiment.

Referring to FIG. 5, after the threaded lead screw 40 has been rotated to position the work table 30 relative to the saddle 38 such that the work piece 28 as seen in FIG. 1, is positioned relative to the tool 22 carried by the machine head 26, the clamping device 20 is positioned.

The clamping device 20 is secured to the worktable 30 by the "T" bolt 68 extending from the projecting upright 66 of the clamp frame 62 received in the "T" slot 56. A spacer or shim 70 is positioned between the projecting upright 66 and the worktable 30 to position the fixed block 72 relative to the threaded lead screw 40. The handle 82 of the clamping device 20 is rotated to move the threaded acme rod 76 inward moving the movable block 74 into engagement with the threaded screw 40 therein preventing the threaded screw 40 from rotating. With the work table 30 positioned, the location of the work piece 28 is checked to determine if it is positioned properly. If the work piece 28 needs to be adjusted, the handle 82 is moved slightly on the acme rod 76 to rotate the rod 76 and move the end 84 slightly away from the fixed block 72. The handle wheel 44 is adjusted slightly to position the work piece 28. Then, the handle 82 is cinched to move the movable block or jaw 74 to engage the fixed block 74 to secure and prevent rotation of the threaded screw 40. In that the threaded lead screw 40 cannot rotate relative to the threaded block 48 as seen in FIG. 1, the work table 30 is held in position relative to the saddle 38, also referred to as the secondary base; the work table 30 and the work piece 28 are held secure relative to the base 32 and the machine head 26.

An alternative embodiment of the clamp device 20 is shown in FIGS. 6 and 7. FIG. 6 is a bottom view of the clamp device 98. The clamp device 98 has a clamping frame 100, an acme rod 76, and a handle 82. The pair of fasteners 92 are shown. In addition, a pair of dowels 102 project from the long base 104 of the clamping frame 100.

Referring to FIG. 7, a sectional view taken along the line 7—7 of FIG. 6 is shown. The clamping device 98 has the clamp frame 100 with the long base 104 and the projecting upright 106. Similar to the previous embodiment, the fixed block 72 is secured to the long base 104 by a pair of fasteners 72 and in addition, a pair of dowels 102. The movable block 74 has a bore 88 that receives the end 84 of the acme rod 76. In contrast to the previous embodiment, the hole 108 in the projecting upright 106 through which the acme rod 76 extends is threaded to facilitate the movement of the acme rod 76.

The clamping device 98 has an adjustment screw or bolt 110 that is received by a threaded hole 112 in the projecting upright 106 of the clamping frame 100 as seen in FIG. 7. The adjustment screw 110 is adjustable so that it may engage the surface of the working table 30 to space the clamping frame 100 properly so that the apertures 116 of the fixed block 72 and 74 are positioned properly to receive the threaded lead screw 40. In one embodiment, a spacer is positioned between the adjustment screw 110 and the work table 30 to prevent the screw from scratching the work table 30. The adjustment screw 110 is in addition to a T-bolt received by the "T"-slot on the front surface of the work table 30 to hold the clamp device 90 to the work table 30.

Similar to the first embodiment, the fixed block 72 is fixed in position relative to the threaded screw 40. The fixed block 72 is positioned such that its barely touches the threads of the threaded screw 40 to create slight friction to the threaded screw 40. The clamping device 98 is secured to the work table 30 by the T-bolt 68 extending from the projecting upright 102 of the clamp frame 100 received in the "T" slot 56. In addition, the adjustment screw or bolt 110 is adjusted to position the clamp frame 100 relative to the threaded lead screw 40. A spacer is positioned between the end of the adjustment screw 110 and the work table 30 to prevent the adjustment screw 110 from scratching the work table 30. The handle 82 of the clamping device 98 is rotated to move the threaded acme rod 76 inward moving the movable block 74 into engagement with the threaded screw 40 preventing from rotating. With the work table 30 positioned, the location of the work piece 28 is checked to determine it is positioned properly. If the work piece 28 needs to be adjusted, the handle 82 is moved slightly on the acme rod 76 to rotate the rod 76 and move the end 84 slightly away from the fixed block 72. The handle wheel 44 is adjusted slightly to position the work piece 28. Then, the handle 82 is cinched to move the movable block or jaw 74 to engage the fixed block 74 to secure and prevent rotation of the threaded screw 40. In that the threaded lead screw 40 cannot rotate relative to the threaded block 48 as seen in FIG. 1, the work table 30 is held in position relative to the saddle 38, also referred to as the secondary base; the work table 30 and the work piece 28 are held secure relative to the base 32 and the machine head 26.

Figure 8B:
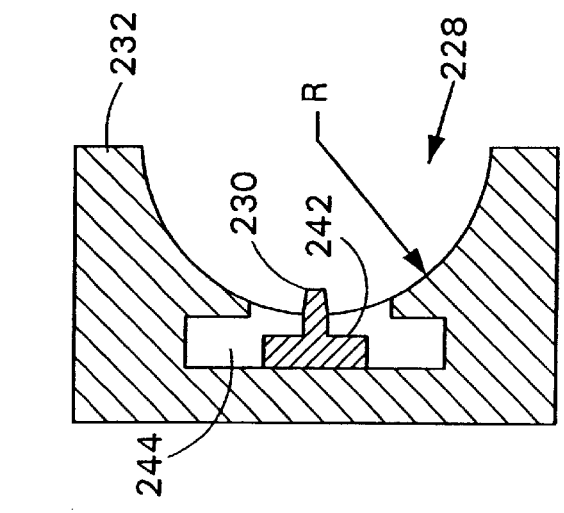
FIG. 8B is a sectional view of the jaw taken along line 8B—8B of FIG. 8A.
Figure 8A:
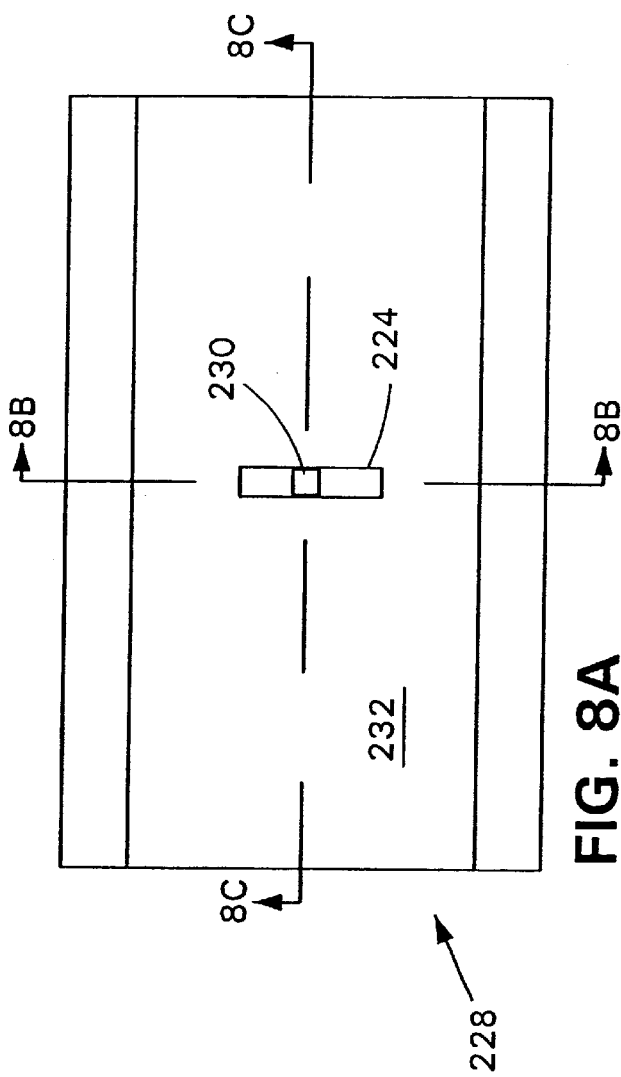
FIG. 8A is a front view of an alternative jaw.
Figure 8C:
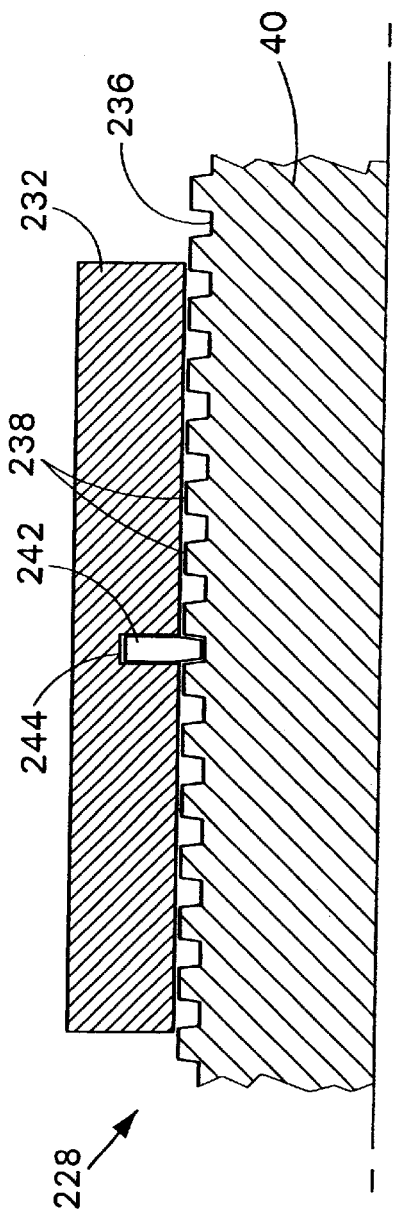
FIG. 8C is a sectional view of the jaw and a portion of the elongated table screw taken along the line 8C—8C of FIG. 8A.

An alternative jaw 228 is shown in FIG. 8A. The alternative block or jaw 228 has a projecting tooth 230 that is moveable relative to a main portion 232 of the jaw 228. The projecting tooth 230 is receivable in the groove 236 between the threads 238 of the elongated table screw 40 as best seen in FIG. 8C. The projecting tooth 230 is carried by a movable base 242 located in a chamber 244 in the main portion 232 of the jaw 228 as seen in FIGS. 8B and 8C. The projecting tooth 230 and the movable base 242 floats, with the movable base 242 capable of moving up and down in the chamber 244. The clamping device is attached to the work table 30 with the "T" bolts, with the projecting tooth 230 of the jaw 228 received in the groove 236 between the threads 238. The projecting tooth 230 can move up and down if necessary if the elongated table screw 40 needs to be rotated slightly as described above and below.

To machine a work piece 28, the machinist/user starts by generally positioning the work table 30 as seen in FIG. 1 by adjusting the height of the knee 46 then moving the saddle 38 in and out to the proper position and then finally adjusting the work table 30 longitudinally. The clamping device is attached to the work table using the "T" bolt received within the T-slot located on the forward edge of the work table 30. The threaded acme rod 76 is rotated using the handle 82 such that the moveable block 74 is brought into engagement with the elongated table screw 40. With the movable jaw/block 74 brought into engagement with the fixed jaw/block 72 or alternative jaw 228 with the projecting tooth 230, the clamping device 20 position, any spacer 70 such as shown in FIGS. 3 and 4, are installed between the projecting upright 66 of the clamping device 20 and the work table 30 or in the alternative such as shown in FIGS. 6 and 7 an adjustment screw is rotated to tighten the clamping device relative to the work table.

With the clamping device 20 secure, the position of the work piece 28 on the work table 30 is checked to determine if it is properly located. If the work needs to be adjusted, the acme rod 76 is rotated to loosen the movable block 74 to allow adjustment of the work table 30 longitudinally by rotation of the elongated table screw 40 by rotation of the handle wheel 44. When the work table is in the proper position, the acme rod is rotated to the moveable block back into engagement with the fixed block snugging the elongated table screw.

The projecting tooth 230 moves up or down in the groove 236 as the elongated table screw 40 is rotated slightly to position the work piece 28 relative to the machine head 26 and the tool 72 as seen in FIG. 1.

Figure 9A:
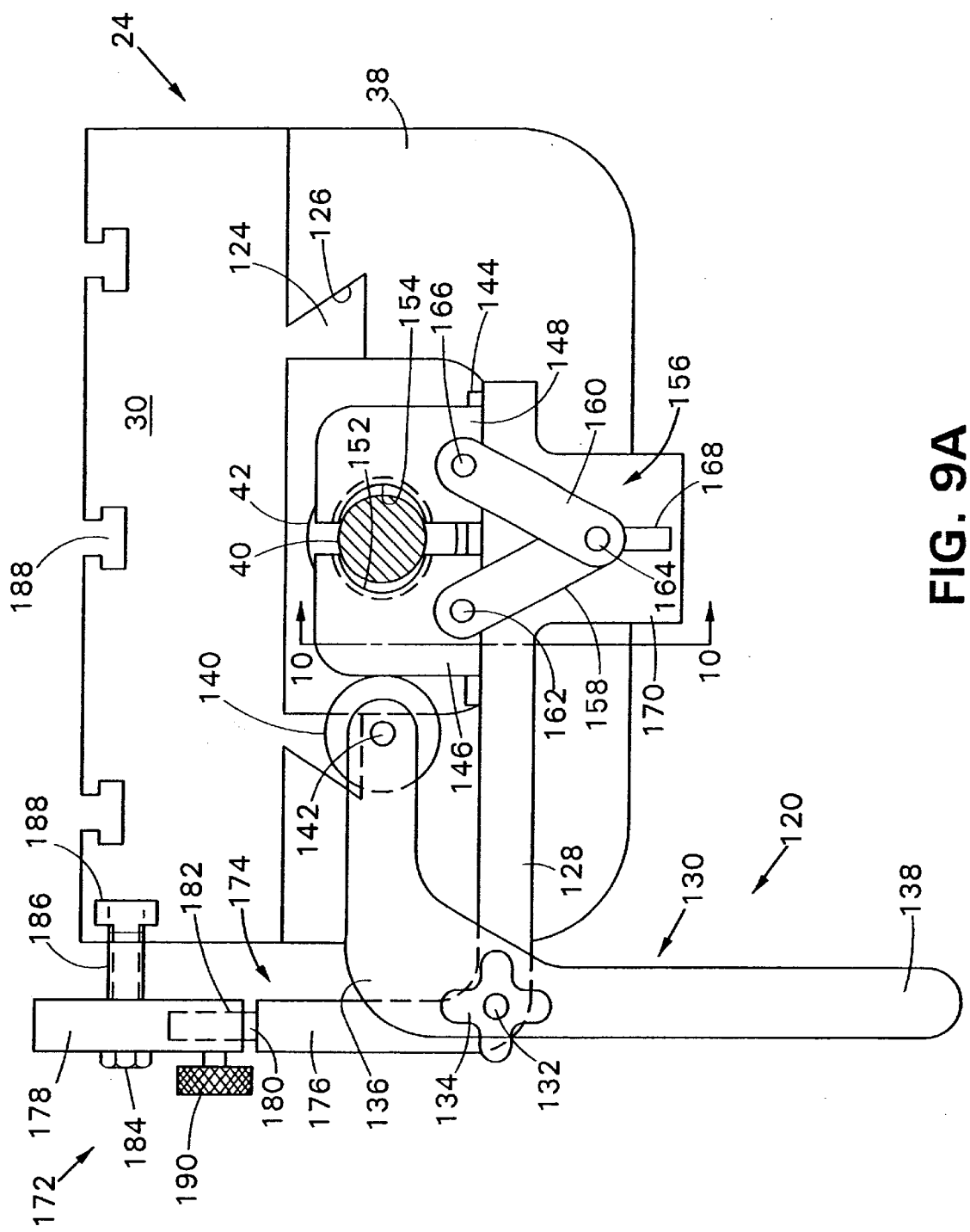
FIG. 9A is a sectional view of a portion of the milling machine with an alternative embodiment clamping device in an open non-clamping position.

Referring to FIGS. 9A–10, an alternative clamping device 120 is shown applied to a machine tool, specifically a milling machine 24.

The milling machine 24 includes a supporting structure, such as the saddle 38, and a work table 30 slideably mounted on the supporting structure 38. The table 30 has a pair of spaced longitudinal rails 124 at the bottom of the table. The rails 124 ride in a pair of grooves 126 at the top of the supporting structure 38. A longitudinally horizontal screw, the threaded screw 40, journeys in a pair of bearings. The screw 40 is threaded into a nut of the threaded block 42 fixed to the supporting structure 38. A crank or handle 42, such as shown in FIG. 1, is attached to each end of the screw 40 for manually rotating the screw and moving the table 30 longitudinally relative to the supporting structure 38.

The clamp on the locking device 120 includes a base 128 and a bell-crank lever, generally indicated by the reference numeral 130, pivotally connected to the base 128 by a pivot pin 132. The forwardly extending end of the pin 132 is threaded and supports a locking handle 134 which is threaded on the pin 132 for locking the lever 130 in a fixed position on the base 128. The lever 130 has a first arm 136 and a second arm 138. A wheel 140 is rotatably mounted on the end of the first arm 136 by means of a pivot pin 142. The upper surface of the base 128 has a horizontal rail or "way" 144. A first clamping jaw 146 and a second clamping jaw 148 are each slidably mounted on the base 128 for movement toward and away from each other.

Each jaw 146 and 148 has a groove 150 on its underside for receiving the way 144, as best seen in FIG. 10. Referring back to FIG. 9A, the jaw 146 has a first arcuate surface 152. The other jaw 148 has a second arcuate surface 154 which faces the first arcuate surface 152. Each of the surfaces 152 and 154 in one embodiment have threads which mate with the helical threads on the screw 40.

The jaws 146 and 148 are operatively connected together for simultaneous and opposite movement by a linkage mechanism, generally indicated by the reference numeral 156. The linkage mechanism 156 includes a first link 158 and a second link 160. One end of the first link 158 is pivotally connected to the first jaw 146 by a pivot pin 162. The opposite end of the first link 158 is pivotally connected to one end of the second link 160 by a pivot pin 164. The opposite end of the link 160 is pivotally connected to the second jaw 148 by a pivot pin 166. The pivot pin 164 extends into a vertical groove 168 in a descending arm 170 of the base 128.

The clamping device 120 also includes an attachment mechanism, generally indicated by the reference numeral 172. The attachment mechanism 172 has a vertical portion 174. The vertical portion 174 has a first part 176 fixed to the base 128, and a second part 178. The first part 176 has an upwardly extending vertical cylindrical post 160. The second part 178 has a downwardly facing cylindrical bore 182 for receiving the post 180 in telescoping fashion. This enables the second part 178 of the attachment mechanism 172 to be telescopingly mounted on the post 180 for adjusting the vertical position of a bolt 184 that is threaded into a T-nut 186 located in a T-slot 188 on the vertical surface of the work table 30. The clamping device 120 is applied to the work table 30 for purposes of clamping the threaded screw 40. The position of the cylindrical post 180 relative to the cylindrical bore 182 is adjusted by the screw 190. The positioning of the jaw clamps 146 and 148 horizontally relative to the threaded screw 140 is done by adjusting the T-nut 186 relative to the second part 178 of the attached mechanism 172. The locking handle 134 is loosened and the second arm 136 of the lever 130 is grasped by the operator and rotated clockwise, as shown in FIG. 9A. This causes the jaw 146 to move toward the screw 40 and, simultaneously, causes the jaw 148 to move toward the screw 40 in the opposite direction by means of the linkage mechanism 156. When the jaws 148 and 150 engage the screw 40, the teeth on the first end and second arcuate surfaces 152 and 154, respectively, mesh with the helical threads on the screw 140. The locking handle 134 is turned to lock the lever 130 on the base 128 and maintain the jaws 148 and 150 in the clamping position shown in FIG. 9B. The screw 40 is unclamped by loosening the handle 134 and manually moving the jaw 148 away from the other jaw 150. This also causes the jaw 150 to move away from the jaw 148 and the screw 40.

Figure 9B:
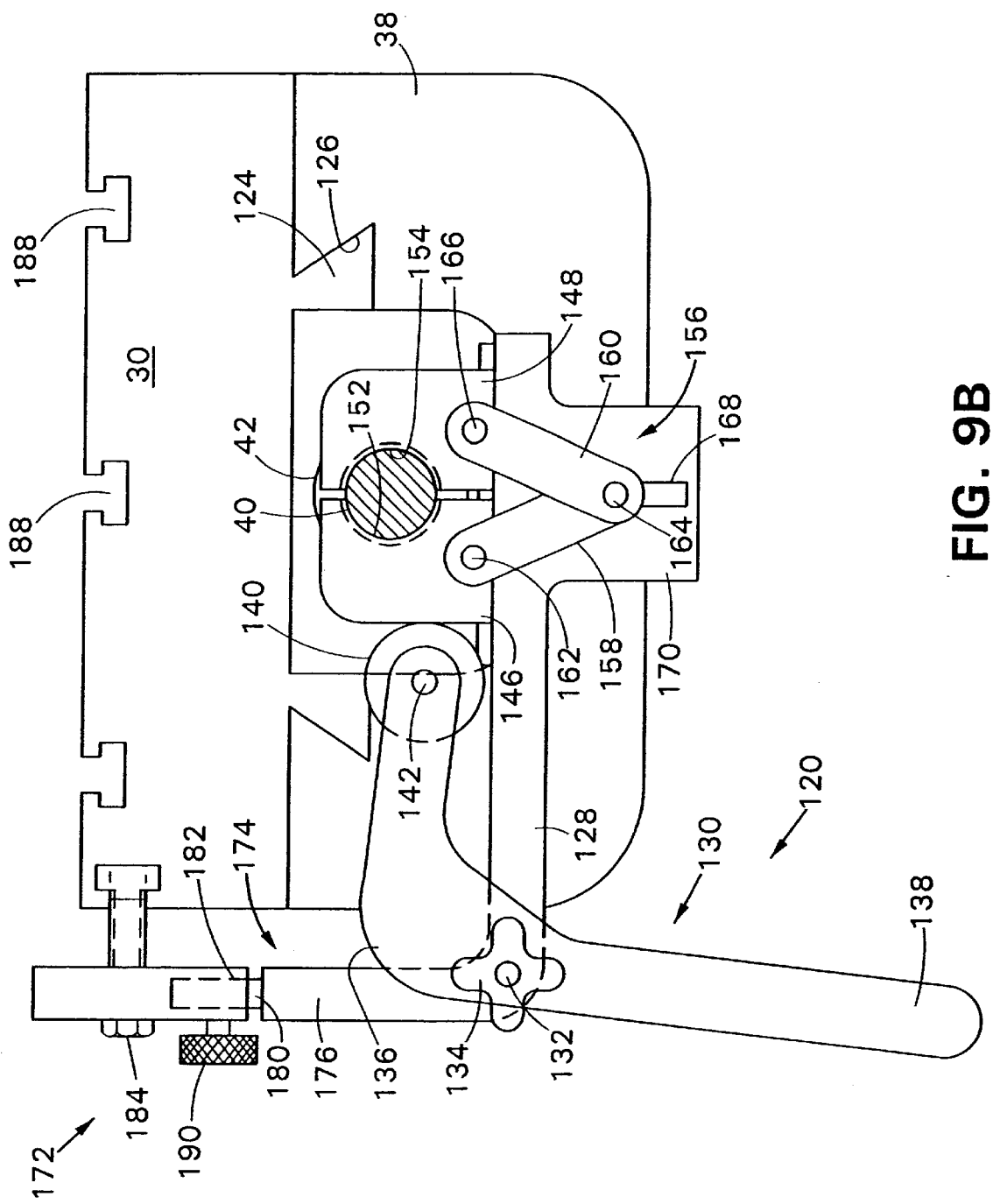
FIG. 9B is a view similar to FIG. 9A with the clamping device in a closed clamping position.
Figure 11A:
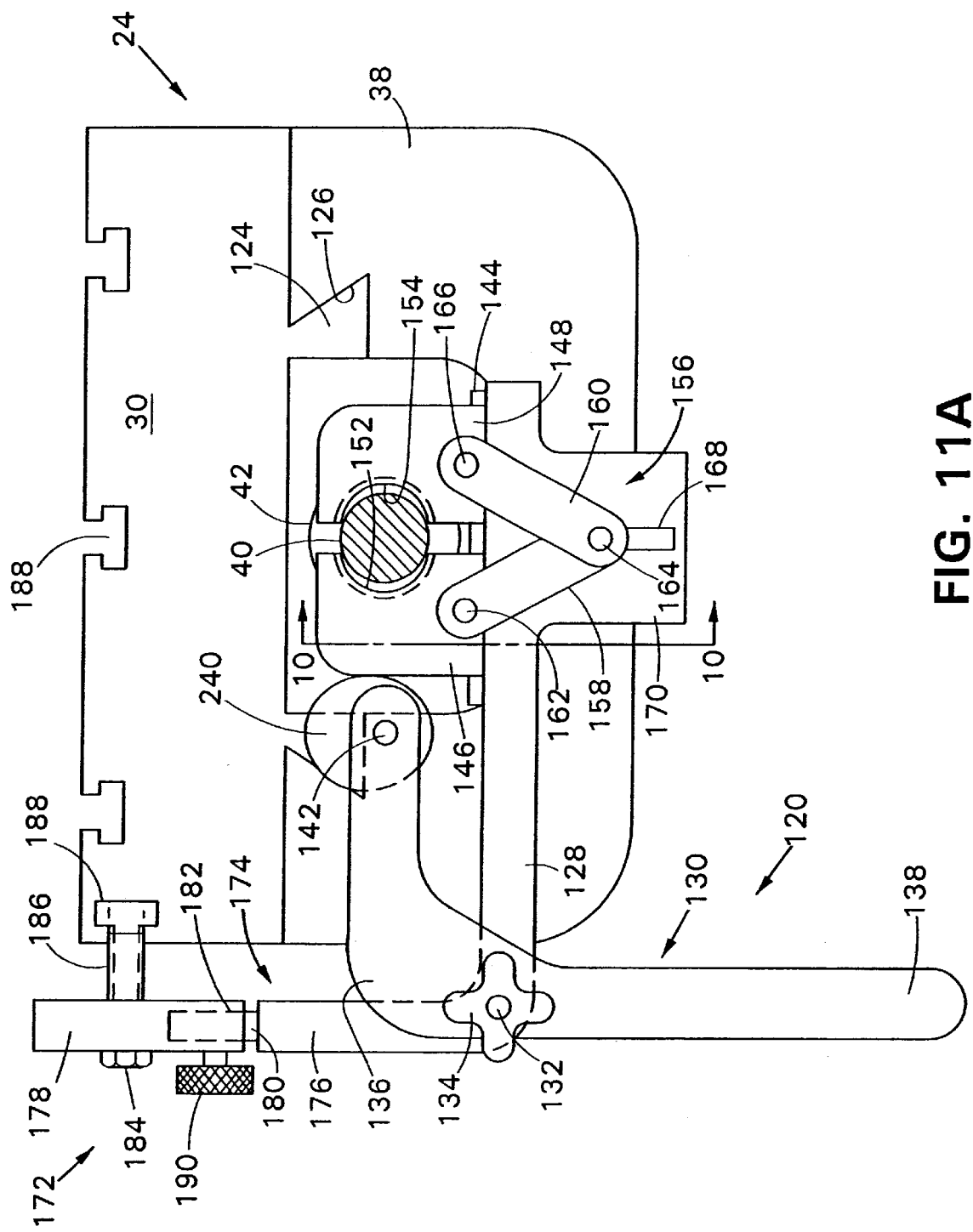
FIG. 11A is a sectional view of a portion of the milling machine with an alternative embodiment of the clamping device of FIGS. 9A–10 in an open non-clamping position.
Figure 11B:
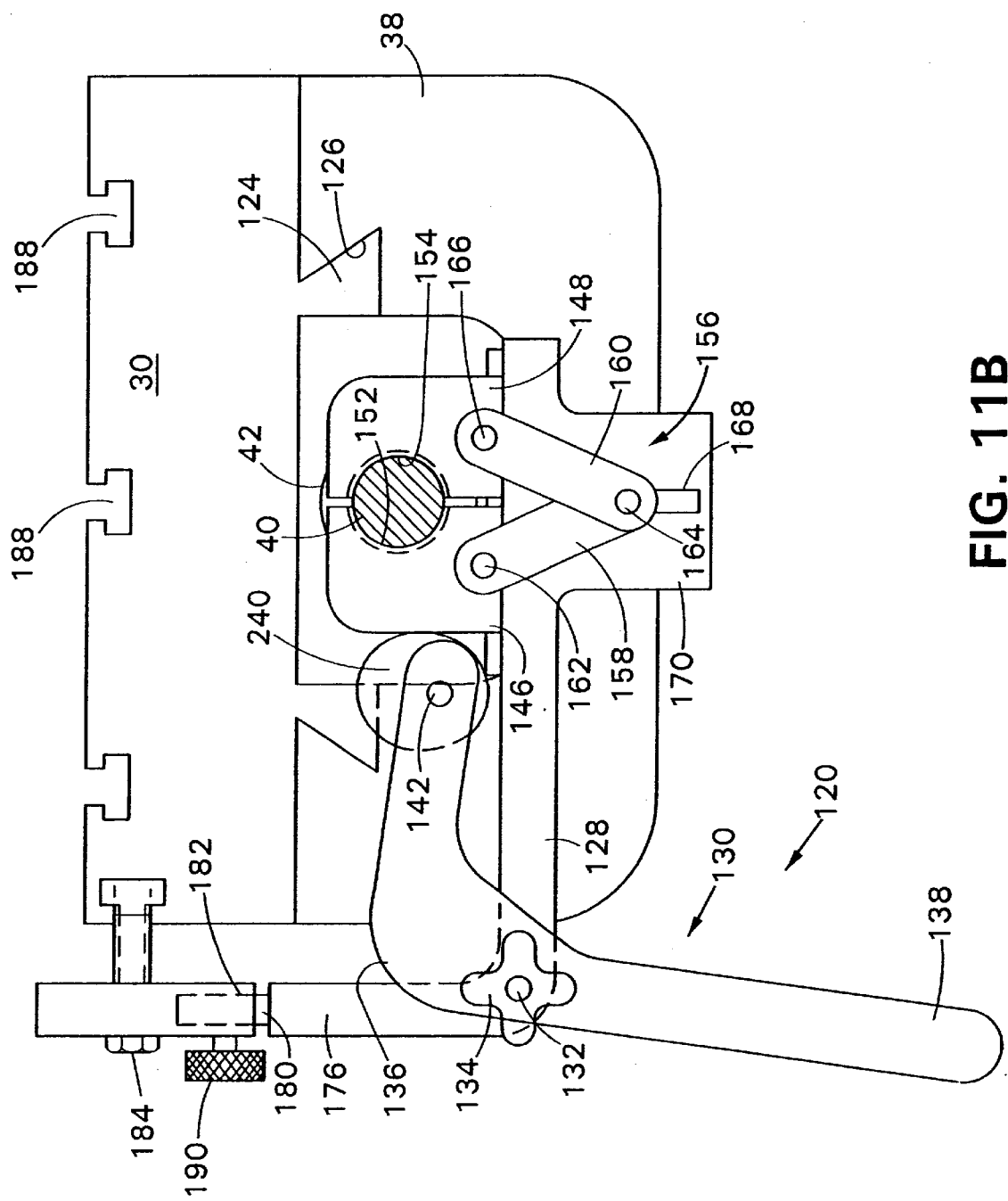
FIG. 11B is a view similar to FIG. 11A with the clamping device in a closed clamping position.

FIGS. 11A and 11B is an alternative clamping device 120 to the clamping device 120 of FIGS. 9A and 9B. The clamping device 120 has a cam 240 rotatably mounted on the end of the first arm 136 by means of a pivot pin 142. The cam 240 is positioned so that the last point, the point furthest from the pivot, engages the first clamping jaw 146 when the clamping jaws 146 and 148 are in the closed portion of FIG. 11B.

Figure 12A:
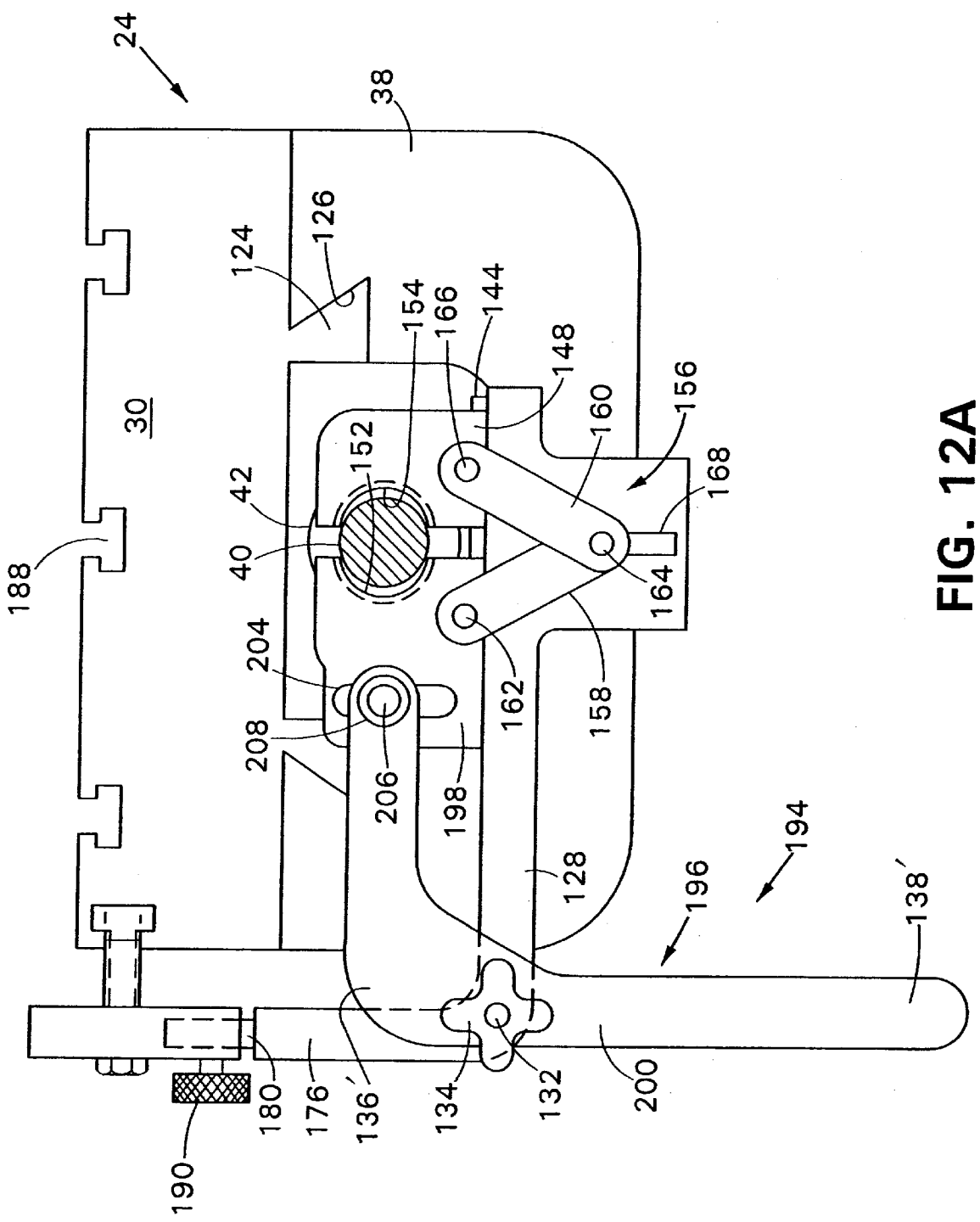
FIG. 12A is a sectional view of a portion of a milling machine with another alternative embodiment clamping device in an open position.
Figure 12B:
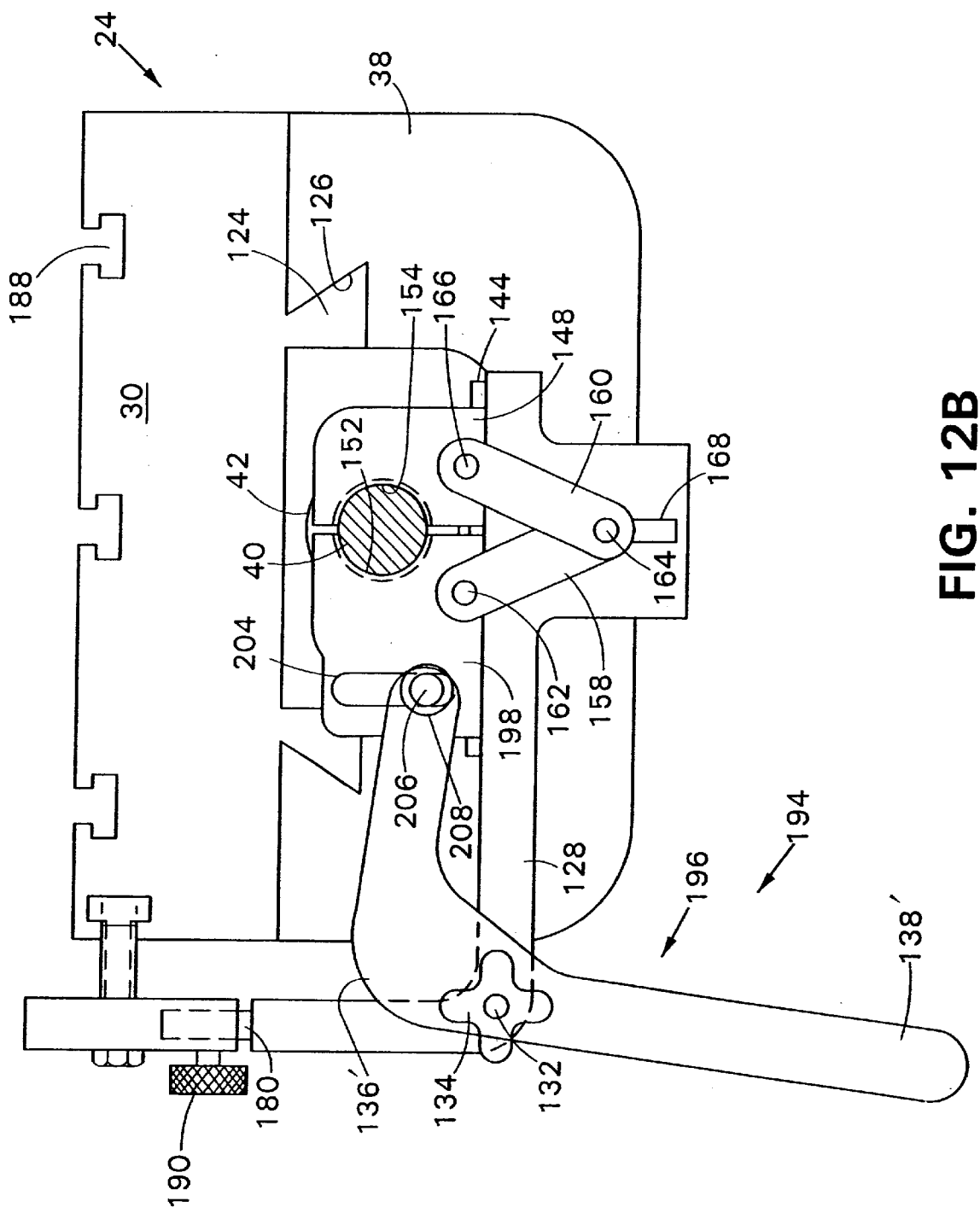
FIG. 12B is a sectional view of the milling machine of FIG. 12A with the clamping device in a closed position.

Referring to FIGS. 12A and 12B, there is shown a modified clamping device, generally indicated by the reference numeral 194. The clamping device 194 is similar to the clamping device 120 with respect to the attachment mechanism 72, the base 128, the second clamping jaw 148, and the linkage mechanism 156. The clamping device 194 differs from the clamping device 120 with respect to the actuating mechanism which is generally indicated by the reference numeral 196, and the first clamping jaw which is generally indicated by the reference numeral 198. The actuating mechanism 196 is a bell crank lever 200 having a first arm 202 and a second arm 138'. The first clamping jaw 198 has an arcuate surface 152 for engaging the threaded lead screw 40 and in one embodiment contains threads which are complimentary with the threads on the screw 40. The clamping jaw 198 has an elongated vertical slot 204 for receiving a guide pin 206 rotatably mounted in a bearing 208 fixedly mounted in the end of the arm 202. When the arm 138' is rotated clockwise, as viewed in FIG. 12A, a guide pin 206 moves downwardly a slot 204 and forces the jaw 198 towards the screw 40. This also causes the clamping jaw 148 to move towards the screw 40, due to the linkage mechanism 156. The screw 40 is clamped against rotation by the jaws 148 and 198 when they are in the position shown in FIG. 12B, for preventing the screw 40 from turning about its longitudinal axis. The actuating mechanism 196 is fixed in the clamping position by rotating the locking handle 134. When the table 30 is to be repositioned, the locking handle 134 is loosened and the second arm 138' is rotated counter-clockwise, as viewed in FIGS. 12A and 12B. This causes the pin 206 to move the jaw 198 away from the screw 40 and also causes the jaw 148 to move away from the screw 40, due to the linkage mechanism 156. The clamping and unclamping of the threaded lead screw 40 by the jaws 148 and 198 is controlled entirely by the manual actuation of the arm 138'.

Figure 13A:
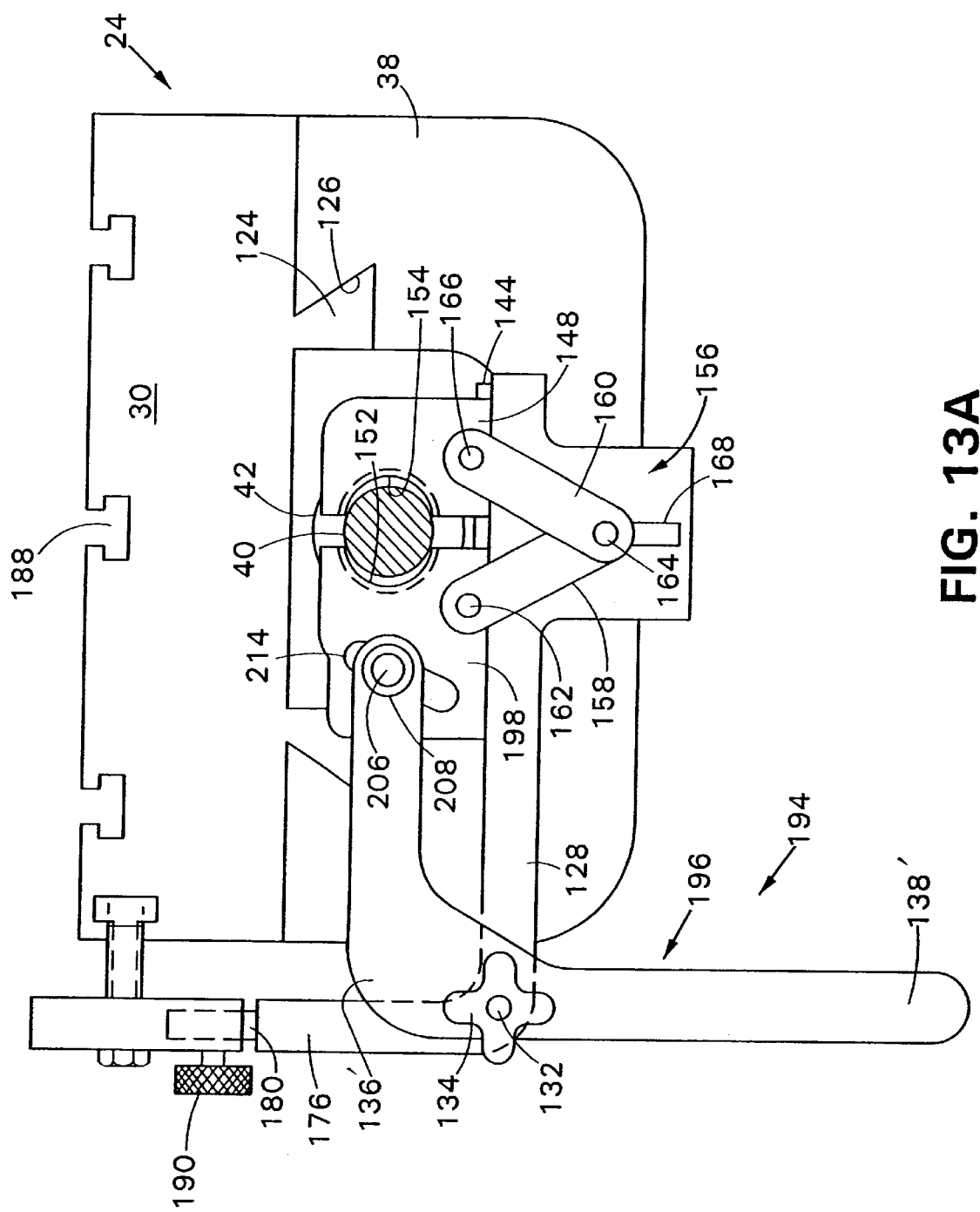
FIG. 13A is a sectional view of a portion of a milling machine with an alternative embodiment of the clamping device of FIGS. 12A and 12B in an open non-clamping position.
Figure 13B:
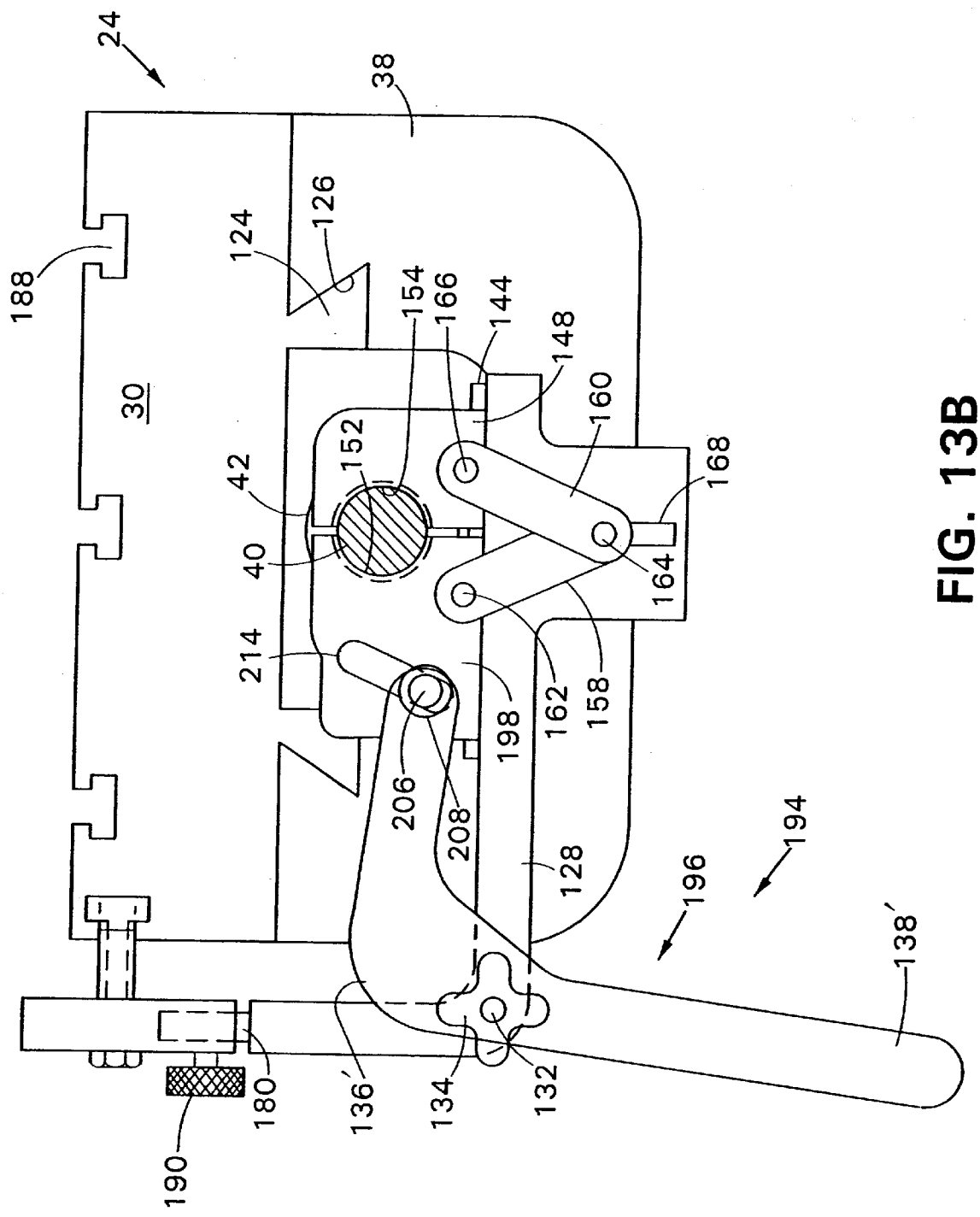
FIG. 13B is a sectional view of the milling machine of FIG. 13A with the clamping device in a closed position.

Referring to FIGS. 13A and 13B, the slot 214 carried by the first clamping jaw 198 is angled. As the guide pin 206 moves downwardly in the slot 214, the distance between the slot 214 and the arcuate surface of the first clamping jaw 198 increases. The angle of the slot 214 ensures that the clamping jaws 198 and 148 move snuggly into engagement.

Figure 14:
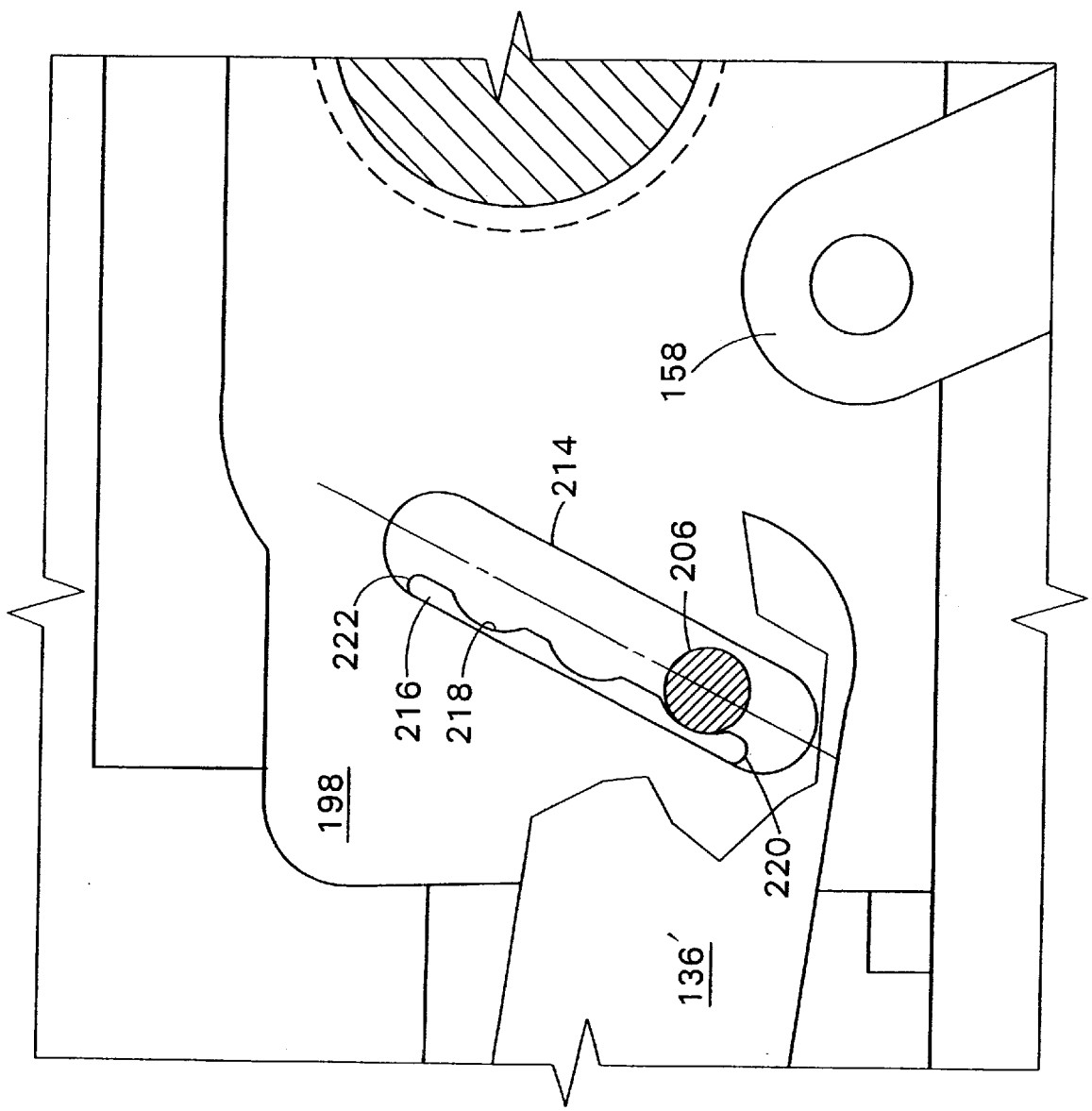
FIG. 14 is an enlarged view of the slot with an insert.

FIG. 14 shows an enlarged view of the slot 214 of the first clamping jaw 198. The slot 214 receives an insert 216 that has a plurality of arcuate surfaces 218 for receiving the guide pin 206 when the clamping device is closed, such as shown in FIG. 13B. (The first arm 136 is partially broken away and the bearing 208 removed for clarity). The insert 216 is tapered so that one edge 220 is wider than the other edge 222. The insert 216 is reversible and can be presented in either direction to allow the proper arcuate surface 218 to be positioned.

While this invention has been particularly shown and described with references to preferred embodiments thereof, it will be understood by those skilled in the art that various changes in form and details may be made therein without departing from the spirit and scope of the invention as defined by the appended claims.

What is claimed:

1. A clamping device for a machine tool, the machine tool having a work table unit and a saddle unit, the work table slidably mounted to the saddle, an elongated screw carried by one of the units and a threaded block carried by the other unit and threadably receives the elongated screw, the clamping device comprising:
   a frame secured to one of the units;
   a pair of jaws, the jaws each having an arcuate surface for engaging the elongated table screw; and
   a clamping mechanism for moving the jaws relative to each other and engaging the elongated table screw.

2. A clamping device of claim 1 wherein the one of the pairs of jaws is a fixed jaw that is secured to the frame and the other jaw is a movable jaw that is movable related to the frame, and wherein the clamping mechanism is a threaded screw carried by the frame and movable to move the movable jaw relative to the frame and the fixed jaw.

3. A clamping device of claim 2 wherein the threaded screw of the clamping mechanism is an acme threaded screw.

4. A clamping device of claim 2 wherein one of the jaws has a projecting tooth for engaging the elongated screw, the projecting tooth movable in one direction relative to the one of the jaws.

5. A clamping device of claim 1 further comprising an adjustment screw carried by the frame to space the frame from the work table to position the jaws relative to the elongated table screw.

6. A clamping device of claim 5 further comprising a spacer to interpose between the adjustment screw and the work table.

7. A clamping device of claim 5 further comprising a T-bolt carried by the frame of the clamping device for securing the clamping device to the work table.

8. A clamping device of claim 1 further comprising:
   a linkage mechanism connecting the pair of jaw clamps and wherein both jaw clamps are movable relative to each other, and wherein the clamping mechanism is an actuator for moving the clamping jaws towards each other.

9. A clamping device of claim 8 wherein one of the jaws has a slot and the actuator has a guide pin slideable in the slot.

10. A clamping device of claim 9 wherein the slot is at an angle relative to the perpendicular direction to the motion of the jaw.

11. A clamping device of claim 9 further comprising an insert having a plurality of arcuate surfaces and receivable by the slot for engaging the guide pin.

12. A clamping device of claim 8 wherein the actuator has a roller for engaging one of the jaws.

13. A clamping device of claim 10 wherein the roller has a cam shape.

14. A machine tool comprising:
   a base unit;
   a knee unit that is carried by the base unit and movable in a vertical direction relative to the base unit;
   a saddle unit, the saddle unit carried by the knee unit and movable in a transverse direction relative to the base unit and knee unit;
   a work table unit, the work table unit slidably mounted to the saddle;
   an elongated screw carried by the work table unit;
   a threaded block secured to the saddle unit, the elongated screw threadably received by the threaded block and rotated to move the work table in a longitudinal direction relative to the saddle unit;
   a clamping device having a housing carried by the work table unit, a pair of jaws, each of the jaws having an arcuate surface for engaging the elongated screw, one of the jaws secured to the housing and the carried by the other unit and a threadably receiving the elongated screw, the clamping device including a housing secured to one of the units;
   a pair of jaws, the jaws each having an arcuate surface for engaging the elongated screw; and
   a mechanism for moving the jaws relative to each other.

15. A machine tool of claim 14 wherein one of the pair of jaws is a fixed saw that is secured to the frame and the other jaw is a movable jaw related to the movable frame, and wherein the clamping mechanism is a threaded screw carried by the frame and movable to move the movable jaw relative to the frame and the fixed jaw.

16. A clamping device of claim 15 wherein one of the jaws has a projecting tooth for engaging the elongated screw, the projecting tooth movable in one direction relative to the one of the jaws.

17. A clamping device of claim 14 further comprising an adjustment screw carried by the frame to space the frame from the work table to position the jaws relative to the elongated table screw.

18. A clamping device of claim 17 further comprising a spacer to interpose between the adjustment screw and the work table.

19. A clamping device of claim 17 further comprising a T-bolt carried by the frame of the clamping device for securing the clamping device to the work table.

20. A clamping device for a machine tool having a supporting structure, a work table slidably mounted on the supporting structure and an elongated screw having external helical threads and operably connected to the supporting structure and table for enabling the table to move relative to the supporting structure and longitudinally of the central longitudinal axis of the screw, the locking device comprising:

(a) a base;
   (b) a first clamping jaw slidably mounted on the base, the first clamping jaw having a first arcuate surface;
   (c) a second clamping jaw slidably mounted on the base for movement toward and away from the first clamping jaw, the second clamping jaw having a second arcuate surface;
   (d) a linkage mechanism operably connected to the base and the first and second clamping jaws so that the first and second clamping jaws move toward one another when one of the first and second clamping jaws is moved toward the other of the first and second clamping jaws and the first and second clamping jaws move away from one another when one of the first and a second clamping jaws is moved away from the other of the first and second clamping jaws;
   (e) an attachment mechanism for connecting the base to the work table in a fixed position relative to the work table so that screw is between the first and second clamping jaws and spaced from the arcuate surfaces of the first and second clamping jaws; and
   (f) an actuator mounted on the base for moving the first clamping jaw toward the second clamping jaw, so that when the first clamping jaw is moved by the actuator toward the second clamping jaw, the second clamping jaw is moved toward the first clamping jaw and the first and second clamping jaws are effective to clamp the screw and to prevent the screw from rotating about its longitudinal axis.

21. A clamping device as recited in claim 20, wherein each of the first and second arcuate surfaces has external threads which mesh with the threads of the screw.

22. A clamping device as recited in claim 21, wherein the actuator is a lever pivotally connected to the base, the lever having a first arm in actuating engagement with the first clamping jaw and a second arm for being grasped by an operator for causing the first arm to move the first clamping jaw when the second arm is moved in one direction by the operator.

23. A clamping device as recited in claim 22, wherein the second arm has a free end and a roller rotateably mounted on the free end, the roller being adapted to engage the first clamping jaw.

24. A clamping device as recited in claim 23, wherein the roller has a cam shape.

25. A clamping device as recited in claim 22, wherein the first clamping jaw has a slot and the second arm has a guide pin which extends into the slot so that when the lever is pivoted, the guide pin moves along the slot for moving the first clamping jaw toward the second clamping jaw when the lever is pivoted in a first direction and for moving the first clamping jaw away from the second clamping jaw when the lever is pivoted in a second direction.

26. A clamping device of claim 25 wherein the slot is at an angle relative to the perpendicular direction to the motion of the jaw.

27. A clamping device as recited in claim 25, wherein the pin is rotateably mounted in the second arm.

28. A clamping device of claim 25 further comprising an insert having a plurality of arcuate surfaces and receivable by the slot for engaging the guide pin.

29. A clamping device as recited in claim 20, wherein the table has a vertical surface and T-slot in the vertical surface and the attachment mechanism is a connecting arm having a first vertical portion connected to the base and a second vertical, the second vertical portion having an aperture for enabling a bolt to be extended through the aperture to a T-nut in the T-slot for securing the second vertical portion to the table portion when the first and second clamping jaws are in engagement with the screw.

30. A clamping device as recited in claim 29, wherein the attachment mechanism further comprises a releasable locking mechanism for releaseably securing the second arm in a fixed position relative to the first arm.

31. A machine tool comprising:

(a) a supporting structure;
   (b) a work table slidably mounted on the supporting structure;
   (c) an elongated screw having external helical threads and operably connected to the supporting structure and table for enabling the table to move relative to the supporting structure and longitudinally of the central longitudinal axis of the screw; and
   (d) a clamping device comprising:
      (1) a base;
      (2) a first clamping jaw slidably mounted on the base, the first clamping jaw having a first arcuate surface;
      (3) a second clamping jaw slidably mounted on the base for movement toward and away from the first clamping jaw; the second clamping jaw having a second arcuate surface;
      (4) a linkage mechanism operably connected to the base and the first and second clamping jaws so that the first and second clamping jaws move toward one another when one of the first and second clamping jaws is moved toward the other of the first and second clamping jaws and the first and second clamping jaws move away from one another when one of the first and a second clamping jaws is moved away from the other of the first and second clamping jaws;
      (5) an attachment mechanism for connecting the base to the work table in a fixed position relative to work table so that screw is between the first and second clamping jaws and spaced from the arcuate surfaces of the first and second clamping jaws; and
      (6) an actuator mounted on the base for moving the first clamping jaw toward the second clamping jaw, so that when the first clamping jaw is moved by the actuator toward the second clamping jaw, the second clamping jaw is moved toward the first clamping jaw and the first and second clamping jaws are effective to clamp the screw and to prevent the screw from rotating about its longitudinal axis.

* * * * *